W. B. CAMPBELL.
FLUSH VALVE FOR FLUSHING TANKS.
APPLICATION FILED JAN. 31, 1914.
1,193,760.
Patented Aug. 8, 1916.
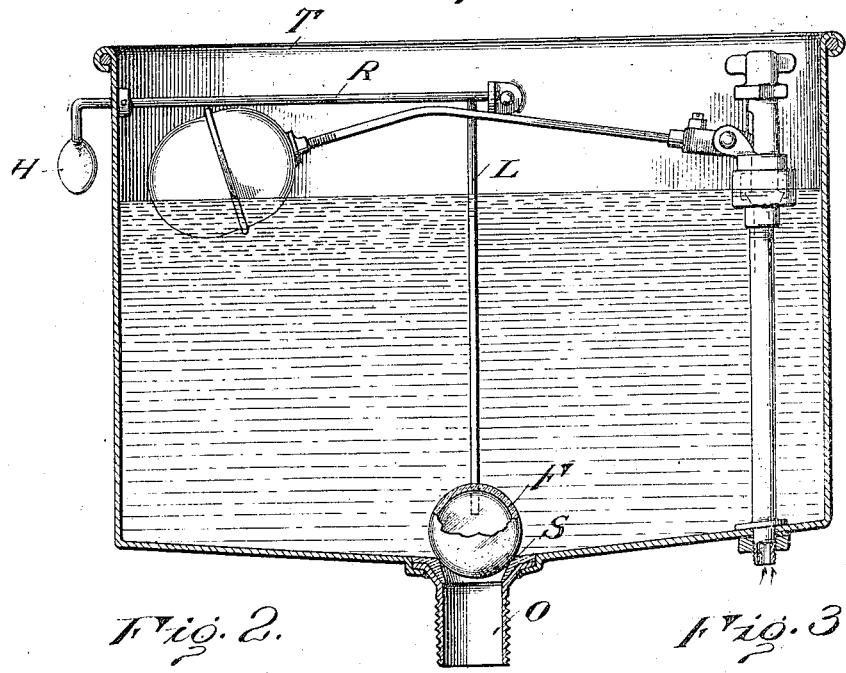
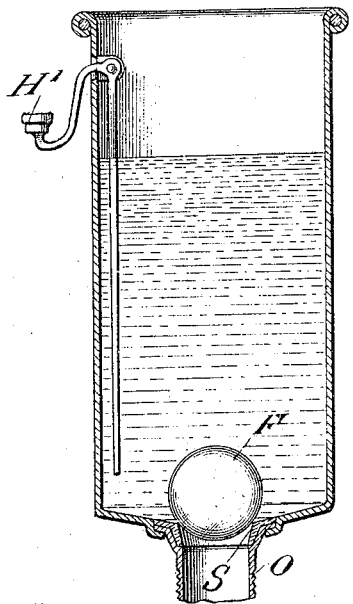
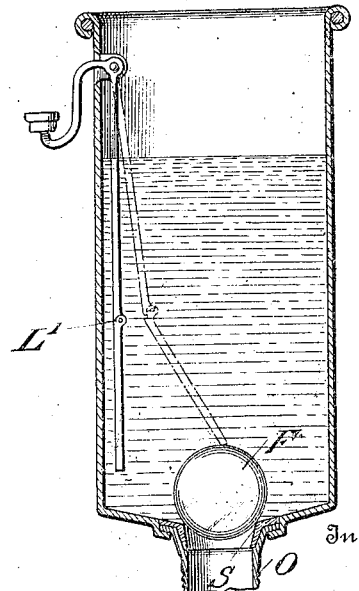
Witnesses
Inventor
William B. Campbell
By Vernon E. Hodge
his Attorney

UNITED STATES PATENT OFFICE.

WILLIAM B. CAMPBELL, OF GADSDEN, ALABAMA.

FLUSH-VALVE FOR FLUSHING-TANKS.

1,193,760.

Specification of Letters Patent.

Patented Aug. 8, 1916.

Application filed January 31, 1914. Serial No. 815,771.

*To all whom it may concern:*

Be it known that I, WILLIAM B. CAMPBELL, a citizen of the United States, residing at Gadsden, in county of Etowah and State of Alabama, have invented certain new and useful Improvements in Flush-Valves for Flushing-Tanks, of which the following is a specification.

My invention relates to an improvement in flush valves for flushing-tanks, and it consists in a buoyant flush-valve made of glass, this being used in connection with a flushing-tank having a valve-seat located at the flush outlet at a point on a lower plane than the remaining portion of the bottom of the tank.

In the accompanying drawing:—Figure 1 is a sectional view through a flushing-tank, and Fig. 2 is a modification; and Fig. 3 is a modification.

F is my improved flush-valve. This is made of vitreous material, such as glass, and I usually prefer to make it hollow so that it will be buoyant and float when released from its seat S.

My years of experience in this art have convinced me that glass is the best material for float valves. I have conducted experiments to prove this, and I am not aware that buoyant flush-valves have ever been made of glass.

Valves of this character are easily and cheaply made. They can be made superficially perfect, and when used with a glass seat, the two have an affinity so that the contact between the two is as near perfect as two contacting surfaces can be made.

A flush valve of glass is practically indestructible, that is to say as far as its operation in a flush-tank is concerned, as it is not susceptible to corroding influences, and does not and need not accumulate on its surface any extraneous material, which, in process of time, all other forms of valves in flushing-tanks do.

The tank T is of any approved construction, but its bottom slopes more or less from all sides to the flush outlet O, and the valve-seat S is located at the upper end of the flush outlet. This may be, and preferably is of glass, as shown, but it might be of rubber or other material, as preferred.

A hollow glass flush-valve will always insure a tight joint when seated, where it is held by suction, and being perfectly spherical in form, and the valve-seat being at a plane lower than the remainder of the bottom of the tank, when the tank is empty the valve invariably rolls by gravity to its seat, where it is retained by suction until unseated.

Thus it will be seen that the tank itself constitutes a receptacle, within the confines of which the flush-valve moves at will and unobstructed, when unseated, and until it graviates to its seat when the tank is empty where it is held by the suction of water in the usual manner.

The unseating may be accomplished in any approved manner. I have shown a simple but effective means of accomplishing this, although other means might, of course, be employed; but the form of construction I have shown consists in an arm L, which is hinged within the tank in any approved manner, and can be operated by a handle H located at one end of the tank at the outer end of a rock-shaft R, as shown in Fig. 1, or by a handle H' extending out through the forward end of the tank, as shown in Fig. 2. The lower end of this arm L terminates at a point a little above the horizontal center of the flushing-valve, so that it has the effect of kicking or rolling the valve over when it is operated and the valve is to be unseated, rather than engaging the valve from beneath, which necessitates lifting it bodily against the entire weight of the water in the tank and the action of the suction from below, thus rendering it much easier to unseat the valve than would otherwise be the case.

The lever for unseating the flush-valve may be made in the form illustrated in Fig. 3, that is to say with a knuckle-joint L', which allows the lever to bend in one direction to clear the ball in case it gets beneath it when it is returning to its normal position.

I claim:—

1. A flushing-tank having an unobstructed interior with a bottom which slopes to a common outlet, a buoyant valve capable of moving about at will located within the confines of the tank and adapted to seat itself at the outlet, and means connected with the tank which automatically assumes a position out of the path of the valve in seeking the outlet, and which means when moved out of its normal position engages the valve and moves it laterally from the outlet and away from the suction.

2. A gravity flushing-tank open to the atmosphere, and having an unobstructed interior with a bottom which slopes to a common outlet, a buoyant valve capable of moving about at will located within the confines of the tank and adapted to seat itself at the outlet, and means connected with the tank which automatically assumes a position out of the path of the valve in seeking the outlet, and which means when moved out of its normal position engages the valve and moves it laterally from the outlet and away from the suction.

3. A flushing-tank, a buoyant valve capable of moving about at will located within the confines of the tank, the tank having an unobstructed interior throughout the entire flush-valve path of movement, with its bottom sloping to a common outlet, and means connected with the tank which automatically takes a position out of the path of the valve and outlet, and which when moved out of its normal position engages the valve and moves it from the outlet and away from the suction.

4. A flushing-tank having an unobstructed interior throughout the entire flush-valve path of movement with its bottom sloping to a common outlet, a buoyant valve capable of moving about at will located within the confines of the tank, and a lever pivoted within the tank out of the path of the valve and in position when moved to engage the valve and move it laterally from the outlet and away from the suction, whereupon the lever returns automatically to a position alongside the inner wall of the tank.

In testimony whereof I affix my signature, in the presence of two witnesses.

WILLIAM B. CAMPBELL.

Witnesses:
J. K. MOORE,
VERNON E. HODGES.